US005898886A

United States Patent [19]

Hewitt

[11] Patent Number: 5,898,886

[45] Date of Patent: Apr. 27, 1999

[54] MULTIMEDIA DEVICES IN COMPUTER SYSTEM THAT SELECTIVELY EMPLOY A COMMUNICATIONS PROTOCOL BY DETERMINING THE PRESENCE OF THE QUATERNARY INTERFACE

[75] Inventor: Larry D. Hewitt, Austin, Tex.

[73] Assignee: Advanced Micro Devices, Inc., Sunnyvale, Calif.

[21] Appl. No.: 08/752,647

[22] Filed: Nov. 19, 1996

[51] Int. Cl.[6] .................... G06F 13/42

[52] U.S. Cl. .................... 395/890; 395/888; 395/886; 395/285; 395/309

[58] Field of Search .................... 395/281, 306, 395/308, 309, 821, 885–894, 387, 285

[56] References Cited

U.S. PATENT DOCUMENTS

| | | | |
|---|---|---|---|
| 4,386,416 | 5/1983 | Giltner et al. | 395/888 |
| 4,631,428 | 12/1986 | Grimes | 326/59 |
| 4,780,883 | 10/1988 | O'Connor et al. | 375/219 |
| 5,099,497 | 3/1992 | Ohno et al. | 375/293 |
| 5,175,822 | 12/1992 | Dixon et al. | 395/275 |
| 5,398,327 | 3/1995 | Yoshida | 395/500 |
| 5,590,275 | 12/1996 | Van Berkel et al. | 395/183.06 |
| 5,649,162 | 7/1997 | Klein et al. | 395/500 |
| 5,671,355 | 9/1997 | Collins | 395/200 |
| 5,678,065 | 10/1997 | Lee et al. | 395/880 |
| 5,682,484 | 10/1997 | Lambrecht | 395/308 |
| 5,689,660 | 11/1997 | Johnson et al. | 395/309 |
| 5,692,211 | 11/1997 | Gulick et al. | 395/800 |
| 5,832,240 | 11/1998 | Larsen et al. | 395/285 |

*Primary Examiner*—Thomas C. Lee
*Assistant Examiner*—Harold J. Kim
*Attorney, Agent, or Firm*—Conley, Rose & Tayon, PC; B. Noel Kivlin

[57] ABSTRACT

A computer system is presented having various peripheral devices coupled to a PCI local bus (i.e., an expansion bus), a subset of the peripheral devices having quaternary interfaces configured to communicate via quaternary signals conveyed upon the PCI local bus. The various peripheral devices may include a video/graphics card, a sound card, a hard disk drive, a CD-ROM drive, and a network interface card. When data is transferred from a master device to a target device, and the master and target devices both have quaternary interfaces, the master device converts the data to quaternary signals before transmitting the data the target device via the PCI local bus. The target device receives the quaternary signals from the PCI local bus and converts the quaternary signals to the binary data. Two binary digits (i.e., bits) of information are advantageously conveyed using quaternary signals in the time required to transmit a single bit using binary signals, thus providing increased efficiency and reduced bus bandwidth requirements. If either device does not include a quaternary interface, the data is transferred using conventional binary signals. A handshaking protocol may be used to determine if both the master and target devices include a quaternary interface. The handshaking protocol is implemented using handshaking signals conveyed over additional control lines added to the PCI local bus. Alternatively, a configuration memory may be included in the quaternary interface of the master device to reduce the required number of additional control lines from two to one.

16 Claims, 3 Drawing Sheets

MULTIMEDIA DEVICES IN COMPUTER SYSTEM THAT SELECTIVELY EMPLOY A COMMUNICATIONS PROTOCOL BY DETERMINING THE PRESENCE OF THE QUATERNARY INTERFACE

FIELD OF THE INVENTION

This invention relates to communications protocols employed within computer systems and, more particularly, to computer systems including multimedia devices that convey data across a bus.

DESCRIPTION OF THE RELATED ART

Computer architectures generally include a plurality of devices interconnected by one or more various buses. For example, modern computer systems typically include a CPU coupled through bridge logic to main memory. The bridge logic also typically couples to a high bandwidth local expansion bus, such as the peripheral component interconnect (PCI) bus or the VESA (Video Electronics Standards Association) VL bus. Examples of devices which can be coupled to local expansion buses include video accelerator cards, audio cards, telephony cards, SCSI adapters, network interface cards, etc. An older type expansion bus is generally coupled to the local expansion bus. Examples of such older type expansion buses included the industry standard architecture (ISA) bus, also referred to as the AT bus, the extended industry standard architecture (EISA) bus, or the microchannel architecture (MCA) bus. Various devices may be coupled to this second expansion bus, including a fax/modem, sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and bandwidth.

Unfortunately, computer systems originally designed for business applications are not well suited for the real-time requirements of modern multimedia applications. For example, modern personal computer system architectures still presume that the majority of applications executing on the computer system are non real-time business applications such as word processing and/or spreadsheet applications, which execute primarily on the main CPU. In general, computer systems have not traditionally been designed with multimedia hardware as part of the system, and thus the system is not optimized for multimedia applications.

Computer systems which include multimedia hardware are generally required to transfer large amounts of real time or multimedia data between various components. For example, multimedia hardware is typically designed as an add-in card for optional insertion in an expansion bus of the computer system. Multimedia hardware cards situated on an expansion bus are required to access system memory and other system resources for proper operation. These data transfers occur on the one or more buses within the system. Thus, bus bandwidth constraints limit the rate of multimedia data transfers. Therefore, an improved computer system is desired which provides increased bandwidth for multimedia data transfers and other data transfers.

SUMMARY OF THE INVENTION

The problems outlined above are in large part solved by a computer system including one or more real-time multimedia devices that selectively employ a quaternary communications protocol in accordance with the present invention. Quaternary (i.e., four-level) signals advantageously convey two binary digits (i.e., bits) of information in the time required to transmit a single bit using binary (i.e., two-level) signals. The use of quaternary signals thus provides increased data transfer efficiency and reduced bus bandwidth requirements. In one embodiment, the computer system includes a CPU coupled through chip set logic (i.e., bridge logic) to a main memory. The chip set logic also couples to a local expansion bus such as the PCI bus. Various peripheral devices are connected to the PCI bus, including a video/graphics card, a sound card, a hard disk drive, a CD-ROM drive, and a network interface card. Other multimedia devices may further be coupled to the PCI bus as desired. At least two of the peripheral devices include quaternary interfaces which accommodate the conveyance of quaternary signals across the PCI bus for certain communications. A memory controller for controlling the transfer of data to and from main memory may further include a quaternary interface.

When a first multimedia peripheral (i.e., a master device) which includes a quaternary interface requests data from or transfers data to a second device (i.e., a target device), the master device requests the bus in a normal fashion using binary signals. In one embodiment, two handshaking signals are used to signal the presence of quaternary interfaces in both devices. During the address phase of a PCI bus transaction, the master device drives a binary signal conveying the address assigned to the target device upon the multiplexed address/data lines of the PCI bus. The master device also asserts a “quaternary transmit request” signal upon a first control line added to the PCI bus. The target device responds to the address signal driven upon the upon address/data lines of the PCI bus. If the target device includes a quaternary interface, the target device responds to the asserted quaternary transmit request signal by asserting a “quaternary transmit acknowledge” signal upon a second control line added to the PCI bus. If the quaternary transmit request and acknowledge signals are both asserted during the address phase, the master and target devices exchange data during the data phase using quaternary signals. Otherwise the master and target devices exchange data using conventional binary data signals. Accordingly, the computer system accommodates both quaternary conveyances while being backwards compatible with traditional binary peripherals.

During the data phase of a PCI bus write transaction, data is transferred from the master device to the target device. When using quaternary signals, the master device converts binary data signals to quaternary signals and drives the quaternary signals upon the address/data lines of the PCI bus. The target device receives the quaternary signals driven upon the address/data lines of the PCI bus and converts the quaternary signals to binary data signals. During the data phase of a PCI bus read transaction, data is transferred from the target device to the master device. When using quaternary signals, the target device converts the binary data signals to quaternary signals and drives the quaternary signals upon the address/data lines of the PCI bus. The master device receives the quaternary signals driven upon the address/data lines of the PCI bus and converts the quaternary signals to binary data signals.

In an alternative embodiment, each quaternary interface includes a configuration memory. The configuration memory stores a list of addresses assigned to other devices coupled to the PCI bus and including quaternary interfaces.

Prior to the address phase of a PCI bus transaction, a master device including such a quaternary interface compares the address of the target device to each of the device addresses stored in the configuration memory of the master device. If a match is found, the data is exchanged using quaternary signals. The master device asserts a "quaternary transmit" signal upon a control line added to the PCI bus to notify the target device that data is to be exchanged in quaternary form. If no match is found, the data is exchanged using conventional binary data signals. Again, the computer system accommodates both quaternary conveyances while being backwards compatible with traditional binary peripherals.

Therefore, the present invention accommodates a novel computer system architecture which provides improved efficiency for data transfers and increases the performance of real-time applications. The present invention is also optimized for real-time applications and provides increased performance over current computer architectures. The computer system of the present invention thus provides much greater performance for real-time and multimedia applications than prior systems.

BRIEF DESCRIPTION OF THE DRAWINGS

Other objects and advantages of the invention will become apparent upon reading the following detailed description and upon reference to the accompanying drawings in which.

Figure 1:
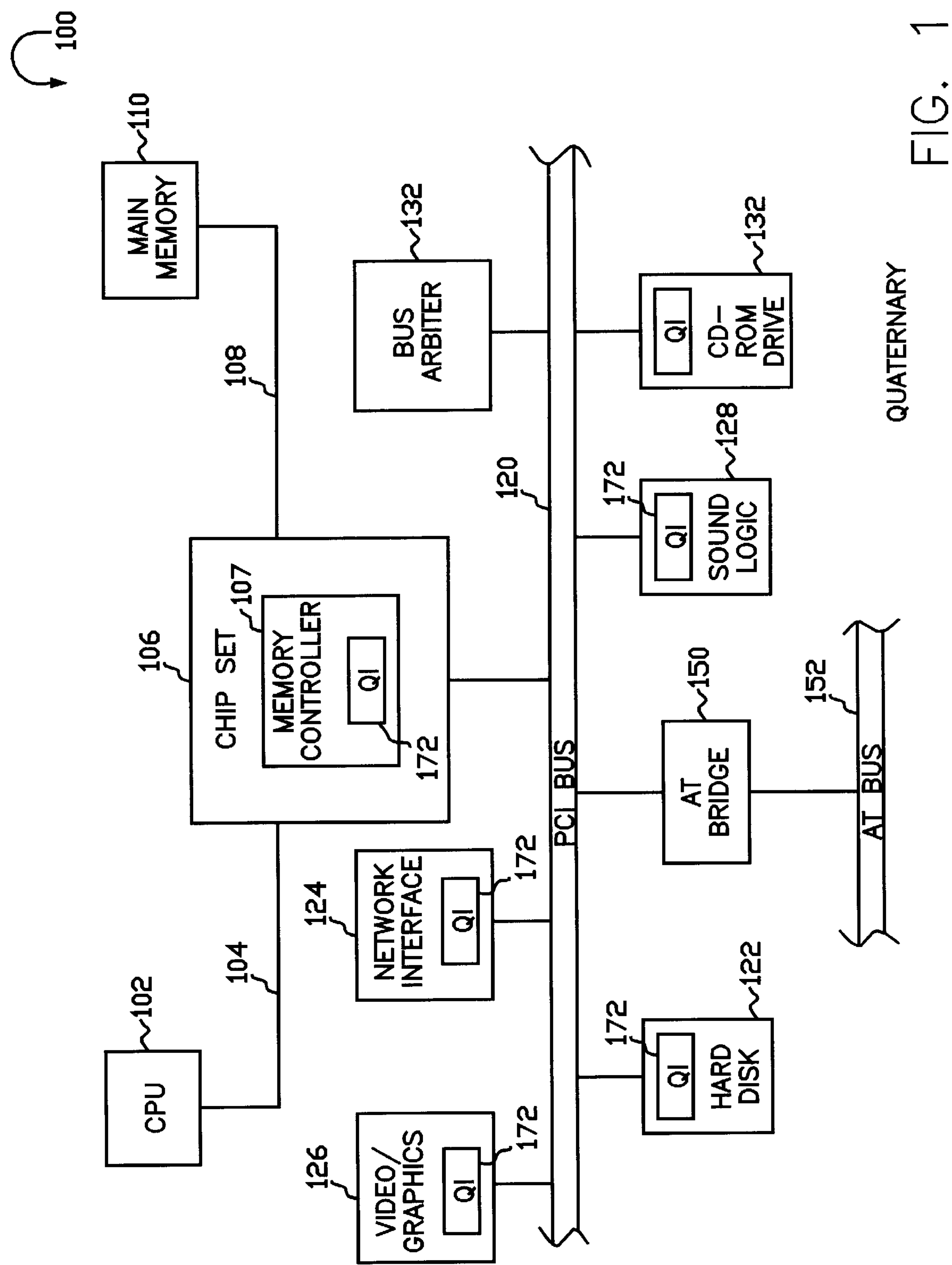
FIG. 1 is a block diagram of a computer system including several components coupled to a peripheral component interconnect (PCI) local bus, wherein each of a subset of the components has a quaternary interface in order to transfer data over the PCI bus using quaternary signals.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Referring now to FIG. 1, a block diagram of a computer system 100 according to one embodiment of the present invention is shown. As shown, the computer system 100 includes a central processing unit (CPU) 102 which is coupled through a CPU local bus 104 to a host/PCI/cache bridge or chip set logic 106. The chip set logic 106 includes memory controller logic 107 as shown.

The chip set logic 106 may include various peripheral logic, including one or more of an interrupt controller system, a real time clock (RTC) and timers, a direct memory access (DMA) system, and ROM/Flash memory (all not shown). The chip set logic 106 may also include various other peripheral logic, including communications ports, diagnostics ports, command/status registers, and non-volatile static random access memory (NVSRAM).

A second level or L2 cache memory (not shown) may also be coupled to a cache controller in the chip set, as desired. The bridge or chip set logic 106 couples through a memory bus 108 to main memory 110. The main memory 110 is preferably DRAM (dynamic random access memory) or EDO (extended data out) memory, as desired.

In the embodiment of FIG. 1, the chip set logic 106 (i.e., host/PCI/cache bridge) or interfaces to a peripheral component interconnect CCI) bus 120. It is noted that other local buses may be used, such as the VESA (Video Electronics Standards Association) VL bus. Various types of devices, including multimedia devices, may be connected to the PCI bus 120.

In the embodiment shown, a video/graphics card 126 and a sound card 128 are coupled to the PCI bus 120. The video/graphics card 126 preferably performs video functions and graphics accelerator functions. The video/graphics card 126 may also perform 2-D and 3-D accelerator functions. The video/graphics card 126 preferably includes a video port for coupling to a video monitor (not shown). The sound card 128 performs audio processing functions. The sound card 128 includes an audio digital to analog converter (audio DAC) (not shown) which couples to an audio port, wherein the audio port is adapted for coupling to speakers (not shown).

A hard disk drive 122, a network interface controller 124 and a CD-ROM drive 132 are also shown coupled to the PCI bus 120. CD-ROM drive 132 may be coupled to PCI bus 120 through a SCSI (small computer systems interface) adapter. The SCSI adapter may also couple to various other SCSI devices, such as a tape drive (not shown), as desired. A bus arbiter 134 is provided to arbitrate control of PCI bus 120 among two or more bus master devices coupled to PCI bus 120.

In the embodiment of FIG. 1, the video/graphics logic 126, the sound logic 128, the CD-ROM drive 132, and the hard disk drive 122 each include a quaternary interface 172 according to the present invention. The network interface controller 124 and memory controller logic 107 also include a quaternary interface 172. The operation of the quaternary interface 172 will be described in detail below.

Expansion bus bridge logic 150 may also be coupled to the PCI bus 120. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, such as expansion bus memory or a modem (both not shown).

Figure 2:
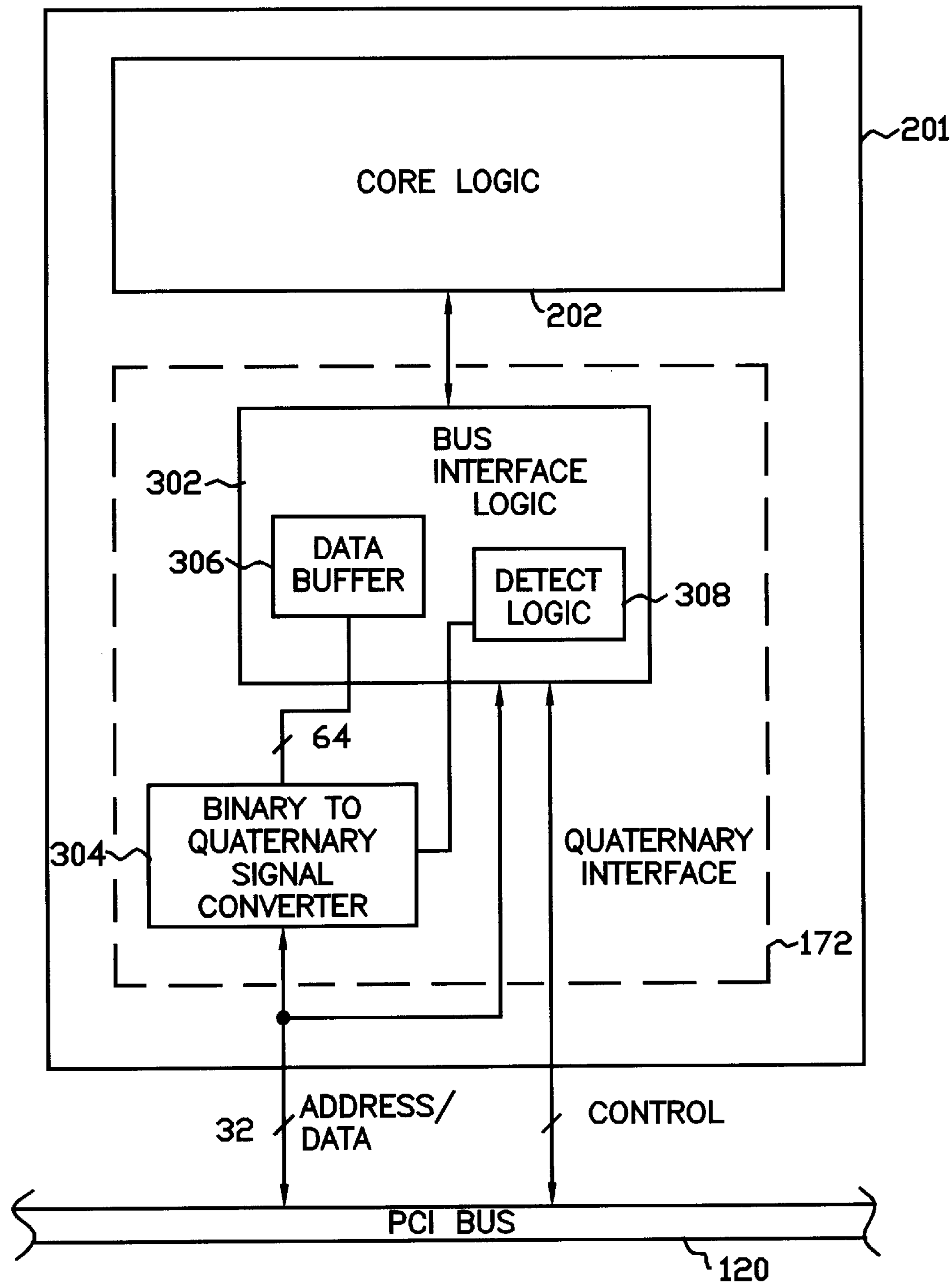
FIG. 2 is a block diagram of a typical component of the computer system of FIG. 1 including an embodiment of the quaternary interface, wherein the component may be memory controller logic of a chip set logic, a video/graphics card, a sound card, a hard disk drive, a network interface controller, or a CD-ROM drive.

The quaternary interface 172 of a component coupled to the PCI bus 120 is configured to accommodate data transfers using quaternary signals upon the address/data lines of the PCI bus 120. FIG. 2 is a block diagram of a typical component 201 of the computer system of FIG. 1 including an embodiment of the quaternary interface 172. The component 201 may be, for example, memory controller logic 107 of chip set logic 106, video/graphics card 126, sound card 128, hard disk drive 122, network interface controller 124, or CD-ROM drive 132. A core logic 202 of the component 201 performs the core functions of the component 201. The quaternary interface 172 is coupled between the core logic 202 and the signal lines of PCI bus 120. The quaternary interface 172 is configured to interface signals between the core logic 202 and PCI bus 120. The quaternary interface 172 includes a bus interface logic 302 and a binary-to-quaternary signal converter 304. The bus interface logic 302 is coupled to the core logic 202 and to the signal lines of the PCI bus 120. The bus interface logic 302 handles the exchange of data between component 201 and other devices coupled to the PCI bus 120 according to an established bus protocol. The binary-to-quaternary signal converter 304 is coupled between the bus interface logic 302 and the multiplexed address/data lines of the PCI bus 120. The bus interface logic 302 includes a data buffer 306 and a quaternary device detect logic 308 coupled to the binary-to-quaternary signal converter 304. The data buffer 306 includes a number of storage elements and temporarily stores data. The stored data is either received from the core logic 202 and is to be transferred to another device via the address/data lines of the PCI bus 120, or was received from the address/data lines of the PCI bus 120. Data received from the address/data lines of the PCI bus 120 may be transferred to the core logic 202. In response to the logic level of a control signal from the quaternary detect logic 308, the binary-to-quaternary signal converter 304 may drive binary data signals from the data buffer 306 upon the address/data lines of the PCI bus 120. Alternatively, the binary-to-quaternary signal converter 304 converts binary data from the data buffer 306 to quaternary form and drives the quaternary signals upon the address/data lines of the PCI bus 120.

In order for a first device (i.e., a master device) to exchange data with a second device (i.e., a target device) using quaternary signals, both the master and target devices must be coupled to the PCI bus 120 and include a quaternary interface 172. In the embodiment of FIG. 2, the control lines of the PCI bus 120 are extended to include at least two additional control lines. The additional control lines are used to implement a quaternary communications protocol. For example, the PCI bus 120 may be provided with two additional control lines. During the bus transaction, the master device requests the bus in a normal fashion using binary (i.e., two-level) signals. During the address phase of a bus transaction, the master device drives a binary signal conveying the address assigned to the target device upon the multiplexed address/data lines of the PCI bus. If the master device includes a quaternary interface, the master device also asserts a "quaternary transmit request" signal upon a first additional control line. The target device responds to the address driven upon the upon address/data lines of the PCI bus. If the quaternary transmit request signal is asserted and the target device includes a quaternary interface, the target device asserts a "quaternary transmit acknowledge" signal upon a second additional control line.

If the master device includes a quaternary interface (i.e., is quaternary compatible) and the master device receives an asserted quaternary transmit acknowledge signal from the target device during the address phase, the master device exchanges data with the target device using quaternary signals. Within the quaternary interface 172 of the master device, the quaternary device detect logic 308 of the bus interface logic 310 receives the quaternary transmit acknowledge signal from the PCI bus 120 and issues a "quaternary convert" control signal to the binary-to-quaternary signal converter 304. During a transfer of information from the master device to the target device (i.e., a write transaction), the binary-to-quaternary signal converter 304 of the master device converts binary signals from the data buffer 306 to quaternary signals, and drives the quaternary signals upon the address/data lines of the PCI bus 120. During a transfer of information from the target device to the master device (i.e., a read transaction), the binary-to-quaternary signal converter 304 of the master device converts quaternary signals present signals upon the address/data lines of the PCI bus to binary signals, and provides the binary signals to the data buffer 306.

Within the quaternary interface 172 of the target device, the quaternary device detect logic 308 of the bus interface logic 310 receives the quaternary transmit request signal from the PCI bus 120 and issues the quaternary convert control signal to the binary-to-quaternary signal converter 304. During a transfer of information from the master device to the target device, the binary-to-quaternary signal converter 304 of the target device converts quaternary signals present signals upon the address/data lines of the PCI bus to binary signals, and provides the binary signals to the data buffer 306 of the target device. During a transfer of information from the target device to the master device, the binary-to-quaternary signal converter 304 of the target device converts binary signals from the data buffer 306 of the target device to quaternary signals, and drives the quaternary signals upon the address/data lines of the PCI bus 120.

In order to convert the binary data signals to quaternary signals, the binary-to-quaternary signal converters 304 of the master and target devices may include an array of two-bit digital-to-analog (D-A) converters. One two-bit D-A converter is required for each address/data line of the PCI bus 120. Each pair of consecutive binary data bits within data buffer 306 may be converted to a single quaternary signal by one of the two-bit D-A converters. In order to convert the quaternary signals to binary signals, the binary-to-quaternary signal converter 304 of the master and target devices may include a two-bit digital-to-analog (A-D) converter. One two-bit A-D converter is required for each address/data line of the PCI bus 120. Each quaternary signal may be converted to a pair of binary data bits by one of the two-bit A-D converters.

If the master device is quaternary compatible and does not receive an asserted quaternary transmit acknowledge signal during the address phase, the master device exchanges data with the target device using conventional binary signals. In this case, the quaternary device detect logic 308 of the quaternary interface 172 of the master device does not assert the quaternary convert control signal. During a transfer of information from the master device to the target device, the binary-to-quaternary signal converter 304 of the master device drives binary signals from the data buffer 306 upon the address/data lines of the PCI bus 120. During a transfer of information from the target device to the master device, the binary-to-quaternary signal converter 304 of the master device receives binary signals present upon the address/data lines of the PCI bus and provides the binary signals to the data buffer 306 of the master device. The target device is not quaternary compatible, and transmits or receives binary data signals via the address/data lines of the PCI bus 120.

If the master device is not quaternary compatible, and the target device is quaternary compatible, the master device does not assert the quaternary transmit request signal during the address phase. The quaternary device detect logic 308 of the target device receives the deasserted quaternary transmit request signal, and the quaternary convert control signal remains deasserted. During a transfer of information from the target device to the master device, the binary-to-quaternary signal converter 304 of the target device drives binary signals from the data buffer 306 of the target device upon the address/data lines of the PCI bus 120. During a transfer of information from the master device to the target device, the binary-to-quaternary signal converter 304 of the target device receives binary signals present upon the address/data lines of the PCI bus and provides the binary signals to the data buffer 306 of the target device.

Figure 3:
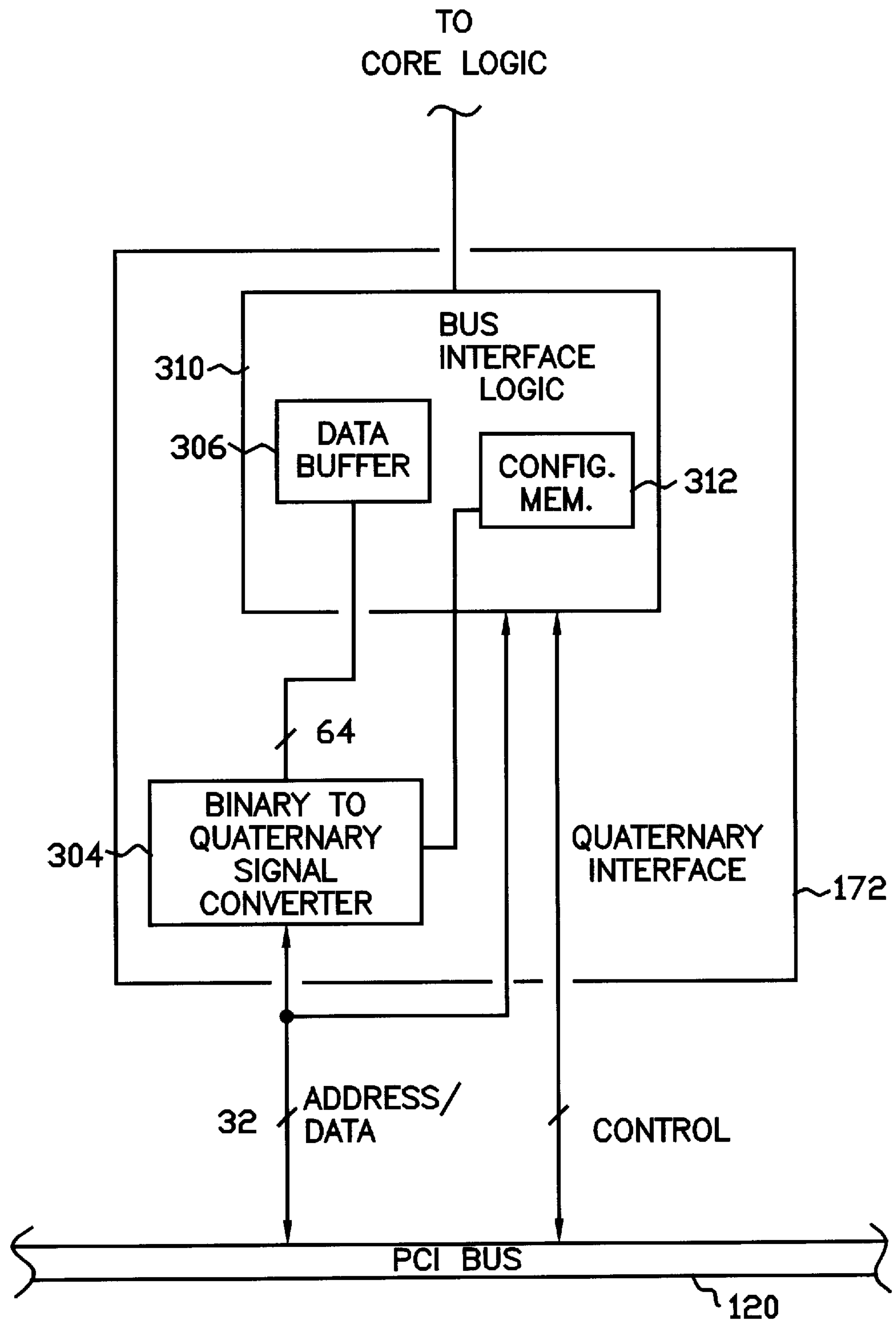
FIG. 3 is a block diagram of an alternate embodiment of the quaternary interface of FIG. 2, wherein the alternate embodiment includes a configuration memory.

FIG. 3 is a block diagram of an alternative embodiment of the quaternary interface 172 including a configuration memory 312. The quaternary interface 172 includes a bus interface logic 310 and the binary-to-quaternary signal converter 304. The bus interface logic 310 is coupled to the core logic of the component containing the quaternary interface 172 and to the signal lines of the PCI bus 120. The bus interface logic 310 handles the exchange of data between the device containing the quaternary interface 172 and other devices coupled to the PCI bus 120 according to an established bus protocol. The binary-to-quaternary signal converter 304 is coupled between the bus interface logic 310 and the address/data lines of the PCI bus 120. The bus interface logic 310 includes a data buffer 306 and the configuration memory 312. The data buffer 306 is coupled to the binary-to-quaternary signal converter 304 and includes a number of storage elements used to temporarily store data as described above. The binary-to-quaternary signal converter 304 either converts binary data from the data buffer 306 to quaternary form and drives the quaternary signals upon the address/data lines of the PCI bus, or drives the binary signals from the data buffer 306 upon the address/data lines of the PCI bus 120 without conversion, in response to the logic level of the quaternary convert control signal from the bus interface logic 310 as described above.

The configuration memory 312 includes several storage elements used to store a list of the addresses assigned to other devices coupled to the PCI bus 120 and including a quaternary interface 172. The configuration memory 312 of the quaternary interface 172 of each device coupled to the PCI bus 120 is preferably programmed at system initialization (i.e., "boot") time to include the addresses assigned to other devices coupled to the PCI bus 120 and including a quaternary interface 172. Each quaternary interface 172 preferably uses "Plug and Play" information received from the computer operating system to generate and maintain the list. More information about the "Plug and Play" standard may be obtained from the Plug and Play BIOS Specification Version 1.Oa and the Plug and Play ISA Specification Version 1.0A. Inclusion of the configuration memory 312 within the quaternary interface 172 allows the number of control lines which must be added to the PCI bus 120 to be reduced to a single additional control line.

Prior to the address phase of a bus transaction initiated by a quaternary-compatible master device in order to exchange data with a target device, the master device compares the address of the target device to the addresses stored within the configuration memory 312. If a match is found, the master device asserts a "quaternary transmit" signal upon the additional control line of the PCI bus 120, in addition to driving binary signals conveying the address of the target device upon the multiplexed address/data lines, during the address phase. The bus interface logic 310 issues the quaternary convert control signal to the binary-to-quaternary signal converter 304. During a transfer of information from the master device to the target device, the binary-to-quaternary signal converter 304 of the master device converts binary signals from the data buffer 306 to quaternary signals, and drives the quaternary signals upon the address/data lines of the PCI bus 120. During a transfer of information from the target device to the master device, the binary-to-quaternary signal converter 304 of the master device converts quaternary signals present signals upon the address/data lines of the PCI bus to binary signals, and provides the binary signals to the data buffer 306.

Within the quaternary interface 172 of the target device, the bus interface logic 310 receives the quaternary transmit signal from the PCI bus 120 and issues the quaternary convert control signal to the binary-to-quaternary signal converter 304. During a transfer of information from the master device to the target device, the binary-to-quaternary signal converter 304 of the target device converts quaternary signals present signals upon the address/data lines of the PCI bus to binary signals, and provides the binary signals to the data buffer 306 of the target device. During a transfer of information from the target device to the master device, the binary-to-quaternary signal converter 304 of the target device converts binary signals from the data buffer 306 of the target device to quaternary signals, and drives the quaternary signals upon the address/data lines of the PCI bus 120.

In order to convert the binary data signals to quaternary signals, the binary-to-quaternary signal converters 304 of the master and target devices may include an array of two-bit digital-to-analog (D-A) converters. One two-bit D-A converter is required for each address/data line of the PCI bus 120. Each pair of consecutive binary data bits within data buffer 306 may be converted to a single quaternary signal by one of the two-bit D-A converters. In order to convert the quaternary signals to binary signals, the binary-to-quaternary signal converter 304 of the master and target devices may include a two-bit digital-to-analog (A-D) converter. One two-bit A-D converter is required for each address/data line of the PCI bus 120. Each quaternary signal may be converted to a pair of binary data bits by one of the two-bit A-D converters.

If the target device does not include a quaternary interface, the address of the target device is not found within the configuration memory 312. In this case, the master device does not assert the quaternary transmit signal upon the additional control line of the PCI bus 120 during the address phase. The bus interface logic 310 of the quaternary interface 172 of the master device does not assert the quaternary convert control signal. During a transfer of information from the master device to the target device, the binary-to-quaternary signal converter 304 of the master device drives binary signals from the data buffer 306 upon the address/data lines of the PCI bus 120. During a transfer of information from the target device to the master device, the binary-to-quaternary signal converter 304 of the master device receives binary signals present upon the address/data lines of the PCI bus and provides the binary signals to the data buffer 306 of the master device. The target transmits and receives binary data signals via the address/data lines of the PCI bus 120.

During an exchange of information between a master device which is not quaternary compatible and a target device which is quaternary compatible, the master device does not assert the quaternary transmit signal upon the additional control line of the PCI bus 120 during the address phase. The quaternary device detect logic of the bus interface logic 310 of the quaternary interface 172 of the target device does not assert the quaternary convert control signal. During a transfer of information from the target device to the master device, the binary-to-quaternary signal converter 304 of the target device drives binary signals from the data buffer 306 of the target device upon the address/data lines of the PCI bus 120. During a transfer of information from the master device to the target device, the binary-to-quaternary signal converter 304 of the target device receives binary signals present upon the address/data lines of the PCI bus and provides the binary signals to the data buffer 306 of the target device.

It is noted that various other devices may include quaternary interface 172 for transferring data via quaternary signals, including modem cards, telephony cards, other storage devices such as DVD (digital video disk) drives, and other multimedia devices, as desired. The CPU 102 may also include a quaternary interface 172.

As an example of the operation of the present invention, if a data transfer is required from the quaternary-compatible memory controller 107 to the quaternary-compatible video/graphics card 126, the quaternary interface 172 of the memory controller 107 first converts the binary data signals to quaternary signals. The quaternary signals are then transferred across the PCI bus 120 to the video/graphics card 126. The quaternary interface 172 of the graphics accelerator 126 receives the quaternary signals and converts the quaternary signals back to binary signals. The data conveyed by the binary signals may then be used by the graphics accelerator 126.

Likewise, if a transfer is required from a device having a quaternary interface 172, such as the video/graphics card 126, the sound card 128, or the hard disk drive 122, to the quaternary-compatible memory controller 107, the quaternary interface 172 of respective device first converts the binary signals to quaternary signals. The quaternary signals are then transferred across the PCI bus 120 to the memory controller 107. The quaternary interface 172 of memory controller 107 receives the quaternary signals and converts the quaternary signals back to binary signals. The data conveyed by the binary signals may then be stored in the main memory 110 for use by the CPU 102 or other devices.

CONCLUSION

Therefore, the present invention comprises a novel computer system architecture which includes quaternary interface logic. Quaternary (i.e., four-level) signals advantageously convey two binary digits (i.e., bits) of information in the time required to transmit a single bit using binary signals. The use of quaternary signals thus provides increased efficiency and reduced bus bandwidth requirements. The computer system of the present invention thus provides greater performance for real-time and multimedia applications than prior systems.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system comprising:

a CPU;

a main memory coupled to the CPU which stores data accessible by the CPU;

a chip set logic coupled to the CPU and to the main memory;

an expansion bus coupled to the chip set logic, wherein the expansion bus is adapted for transferring data;

a plurality of peripheral devices coupled to the expansion bus and configured to transfer data on the expansion bus, wherein a first of said plurality of peripheral devices includes a quaternary interface configured to communicate via either binary or quaternary signals conveyed upon said expansion bus, and wherein said first peripheral device communicates with a second of said plurality of peripheral devices via either binary or quaternary signals dependent upon the presence of a quaternary interface within said second peripheral device;

wherein said expansion bus comprises a plurality of address and data lines, and wherein said first peripheral device determines the presence of a quaternary interface within said second peripheral device by driving: (i) an address assigned to the second peripheral device upon the plurality of address lines, and (ii) an asserted quaternary transmit request signal upon a first control line of a plurality of control lines of the expansion bus;

wherein said second peripheral device receives the address and the asserted quaternary transmit request signal and responds to the address and the asserted quaternary transmit request signal by driving an asserted quaternary transmit acknowledge signal upon a second control line of the plurality of control lines of the expansion bus if the second peripheral device includes a quaternary interface; and wherein said first peripheral device receives the quaternary transmit acknowledge signal and determines that said second peripheral device includes a quaternary interface if the quaternary transmit acknowledge is asserted.

2. The computer system of claim 1, further comprising a memory controller coupled to the main memory for controlling transfers to or from the main memory, wherein the memory controller includes a quaternary interface configured to communicate with said plurality of peripheral devices via quaternary signals conveyed upon said expansion bus.

3. The computer system of claim 2, wherein the quaternary interface comprised in the memory controller receives quaternary signals transferred on said expansion bus and operates to convert said received quaternary signals to binary signals and store said binary signals in the main memory.

4. The computer system of claim 1, wherein the quaternary interface of said first peripheral device includes detection logic configured to determine if said second peripheral device also includes a quaternary interface.

5. The computer system of claim 1, wherein the quaternary interface of said first peripheral device includes a configuration memory for storing addresses assigned to other peripheral devices having a quaternary interface.

6. The computer system of claim 1, wherein at least one of said plurality of peripheral devices comprises video logic for performing video operations.

7. The computer system of claim 1, wherein at least one of said plurality of peripheral devices comprises audio logic for performing audio operations.

8. The computer system of claim 1, wherein at least one of said plurality of peripheral devices comprises a network interface controller for coupling to a network, wherein the network interface controller performs network data transfer functions.

9. The computer system of claim 1, wherein at least one of said plurality of peripheral devices comprises a hard disk drive device for storing data.

10. The computer system of claim 1, wherein said expansion bus comprises the Peripheral Component Interconnect (PCI) bus.

11. A method of transferring binary data from a first device to a second device, wherein the first device includes a quaternary interface configured to transfer data via quaternary signals, and wherein the first and second devices are coupled to a bus comprising a plurality of address and data lines, the method comprising:

the first device determining whether the second device includes a quaternary interface;

the first device generating output signals by either: (i) converting the binary data to quaternary signals if the second device includes a quaternary interface, or (ii) producing the unconverted binary data if the second device does not include a quaternary interface;

the first device driving the output signals upon the plurality of data lines of the bus; and the second device receiving the output signals;

wherein said determining comprises:

said first device driving: (i) an address assigned to the second device upon the plurality of address lines, and (ii) an asserted quaternary transmit request signal upon a first control line of a plurality of control lines of the bus;

said second device receiving the address and the asserted quaternary transmit request signal and responding to the address and the asserted quaternary transmit request signal by driving an asserted quaternary transmit acknowledge signal upon a second control line of the plurality of control lines of the bus if the second device includes a quaternary interface; and said first device receiving the quaternary transmit acknowledge signal and determining that said second device includes a quaternary interface if the quaternary transmit acknowledge is asserted.

12. The method as recited in claim 11, wherein during the step of the first device receiving the quaternary transmit acknowledge signal, the first device determines that the second device includes a quaternary interface if the quaternary transmit acknowledge is not asserted.

13. The method as recited in claim 12, wherein the first device generates output signals by producing the unconverted binary data if the second device does not include a quaternary interface.

14. The method as recited in claim 11, wherein the determining step comprises:

the first device comparing a device address corresponding to the data with one or more device addresses stored in a configuration memory of the quaternary interface of the first device; and the first device determining from a match produced during the comparing step that the second device includes a quaternary interface.

15. The method as recited in claim 14, wherein if no match is found during the comparing step, the first device determines the second device does not include a quaternary interface.

16. The method as recited in claim 15, wherein the first device generates output signals by producing the unconverted binary data if the second device does not include a quaternary interface.

* * * * *